United States Patent [19]

Baek et al.

[11] Patent Number: 5,663,600
[45] Date of Patent: Sep. 2, 1997

[54] VARIABLE SPEED WIND TURBINE WITH RADIALLY ORIENTED GEAR DRIVE

[75] Inventors: Kwang Henry Baek; Joseph Phillip Franz; John Peter Nadzam, all of Erie, Pa.

[73] Assignee: General Electric Company, Erie, Pa.

[21] Appl. No.: 397,820

[22] Filed: Mar. 3, 1995

[51] Int. Cl.⁶ .............................. F03D 11/00; F03D 1/00
[52] U.S. Cl. ................................................ 290/55; 290/44
[58] Field of Search ..................... 290/44, 55; 416/132 B

[56] References Cited

U.S. PATENT DOCUMENTS

| | | | |
|---|---|---|---|
| 2,441,446 | 5/1948 | Schmitter | 74/411 |
| 2,951,631 | 9/1960 | Gregory | 415/191 |
| 4,140,433 | 2/1979 | Eckel | 415/209.1 |
| 4,695,736 | 9/1987 | Doman et al. | 290/44 |
| 4,757,211 | 7/1988 | Kristensen | 290/55 |
| 4,871,923 | 10/1989 | Scholz et al. | 290/55 |
| 5,083,039 | 1/1992 | Richardson et al. | 290/44 |
| 5,155,375 | 10/1992 | Holley | 290/44 |
| 5,222,924 | 6/1993 | Shin et al. | 475/329 |
| 5,225,712 | 7/1993 | Erdman | 290/44 |
| 5,289,041 | 2/1994 | Lis | 290/44 |
| 5,289,042 | 2/1994 | Holley | 290/55 |

OTHER PUBLICATIONS

Schmidt et al., "Evaluating Variable Speed Generating Systems on the DOE/NASA/MOD–O Wind Turbine", circ 1985, pp. 171–176.

Boldin et al., "Induction Generators Adapted to Variable Speed Operated Wind Turbines", European Wind Energy Conference, Oct. 22–26, 1984, Hamburg Frg, pp. 542–547.

Herrera et al., "Harmonics Generated by Two Variable Speed Wing Generating Systems", IEEE Transactions on Energy Conversion, vol. 3, No. 2, Jun. 1988, pp. 267–273.

McNearney et al., "The Effect of a Power Electronic Converter on Power Fluctuation and Harmonic Distortion in a WECS", pp. 237–241, ASME Wind Energy Symposium, Jan. 14–18, 1980.

Thomas, "An Integration Methodology for Large Wind–Energy Conversion Systems", Final Report, Cornell University, School of Electrical Engineering, Ithaca, NY, Jun. 1986.

Brady, "Description and Test Results of a Variable Speed, Constant Frequency Generating System", U.S. Department of Energy, Washington, DC, Dec. 1985.

Herrera et al., "Experimental Investigation of a Variable Speed Constant Frequency Electric Generating System from a Ultility Perspective", Electrotek Concepts, Inc., Knoxville, TN, May 1985.

"Options for Variable Speed Operation of Horizontal Axis Wind Turbine Generators," U.S. Department of Energy, 1989.

*Primary Examiner*—Steven L. Stephan
*Assistant Examiner*—Christopher Cuneo
*Attorney, Agent, or Firm*—Marvin Snyder

[57] ABSTRACT

A wind turbine assembly includes a gear drive assembly having an outer tubular member and an inner tubular member, the inner member being positioned coaxially within the outer member. A pair of spaced bearings circumscribe the inner tubular member and support the outer member for rotation about the inner member. Propeller blades are coupled to the outer member for effecting rotation in response to wind. An electric power generator mounted to the inner member has a rotor shaft extending from one end. A gear unit is drivingly coupled between the rotor shaft and the outer member whereby rotation of the outer member is effective to cause rotation of the rotor shaft at a velocity substantially greater than a rotational velocity of the outer member for generating electric power from the generator.

5 Claims, 3 Drawing Sheets

VARIABLE SPEED WIND TURBINE WITH RADIALLY ORIENTED GEAR DRIVE

BACKGROUND OF THE INVENTION

The present invention relates to wind turbines for operation at variable speed under varying wind conditions, and, more particularly, to a combination wind turbine and AC power generator coupled to a radially oriented gear train.

Wind turbines provide a method for extracting energy from wind and converting the energy into electricity to be supplied either for individual use or into utility power grids. The conversion of wind energy to electrical energy is accomplished by coupling a turbine through appropriate drive means to an electric power generator so that wind blowing onto the turbine will cause the rotor of the power generator to rotate. Typically, the power generator is an alternating current (AC) induction generator. The generator has stationary field windings which are coaxially wound about a rotor that can be driven by the turbine on the wind turbine. If the electrical power generated by the wind turbine is to be supplied to a utility power grid, then it must have a constant frequency, such as 60 Hz, that is synchronized to the utility line frequency. Some wind turbines accomplish this function by operating at a constant speed. However, more efficient wind turbines operate at variable speed, causing the rotor of the AC generator to rotate at variable speed, resulting in an AC power frequency that is variable. In such variable speed wind turbines, the AC power output of the AC generator is rectified and then applied to an inverter which converts the resultant DC power to AC power at a controlled frequency.

In conventional wind turbines, the components of the power train connecting the turbine or turbine rotor blades to the AC generator rotor are laid out in a straight line. The result is an elongated turbine system which tends to require excessive space, be relatively costly, inefficient in power conversion and sometimes unstable under various forms of dynamic loads from varying wind conditions. Such turbines also may pose difficulty in maintenance due to the requirement for alignment of the axially laid-out elements of the turbine system. More particularly, when the major power train components such as the blade hub rotor, clutch, gear box, brake system and cooling system are laid out in a straight line, as is typical in the prior art, the design is elongated and can be susceptible to rotor dynamic unbalanced loading.

SUMMARY OF THE INVENTION

Among the several objects of the present invention may be noted the provision of a wind turbine system which overcomes the above and other disadvantages of the prior art; the provision of a wind turbine system which eliminates the elongated power train layout; and the provision of a power train for a wind turbine system which utilizes a three-dimensional arrangement by radial stacking of gear train components.

In an illustrative form, the invention comprises a variable speed wind turbine having a radially oriented gear drive which includes an inner hollow cylindrical member and an outer hollow cylindrical member, with the inner member being nested generally concentrically within the outer member. An annular flange is attached to one end of the inner member and is adapted to support the inner member in a stationary position. A pair of spaced-apart annular bearing assemblies circumscribe the inner member and support the outer member for rotation about the inner member. An alternating current electric power generator is coupled to the flange end of the inner member and has a rotor shaft extending into a position proximal the end of the inner member. A sun pinion gear is coupled to the rotor shaft at the end proximal the inner member and positioned to engage a plurality of planet gears, each of which is axially positioned about the sun pinion gear. Each of the planet gears is mounted for rotation about its own axis on a corresponding gear shaft, with each gear shaft being supported for rotation on corresponding bearings. A pinion gear is attached to each of the gear shafts for rotation with the gear shafts. A ring gear is formed on an inner surface of the outer member and is adapted to engage each of the pinion gears on the gear shafts such that rotation of the outer member is effective to rotatably drive each of the pinion gears and concurrently drive each associated planet gear such that the sun pinion gear is rotated in response to rotation of the outer member about the inner member. A plurality of propeller blades coupled to the outer member extend radially outward for effecting rotation of the outer member in response to wind impinging on the blades.

BRIEF DESCRIPTION OF THE DRAWINGS

The features of the invention believed to be novel are set forth in the appended claims. The invention, however, together with further objects and advantages thereof, may best be understood by reference to the following description taken in conjunction with the accompanying drawing(s) in which:

DETAILED DESCRIPTION OF THE INVENTION

Figure 1:
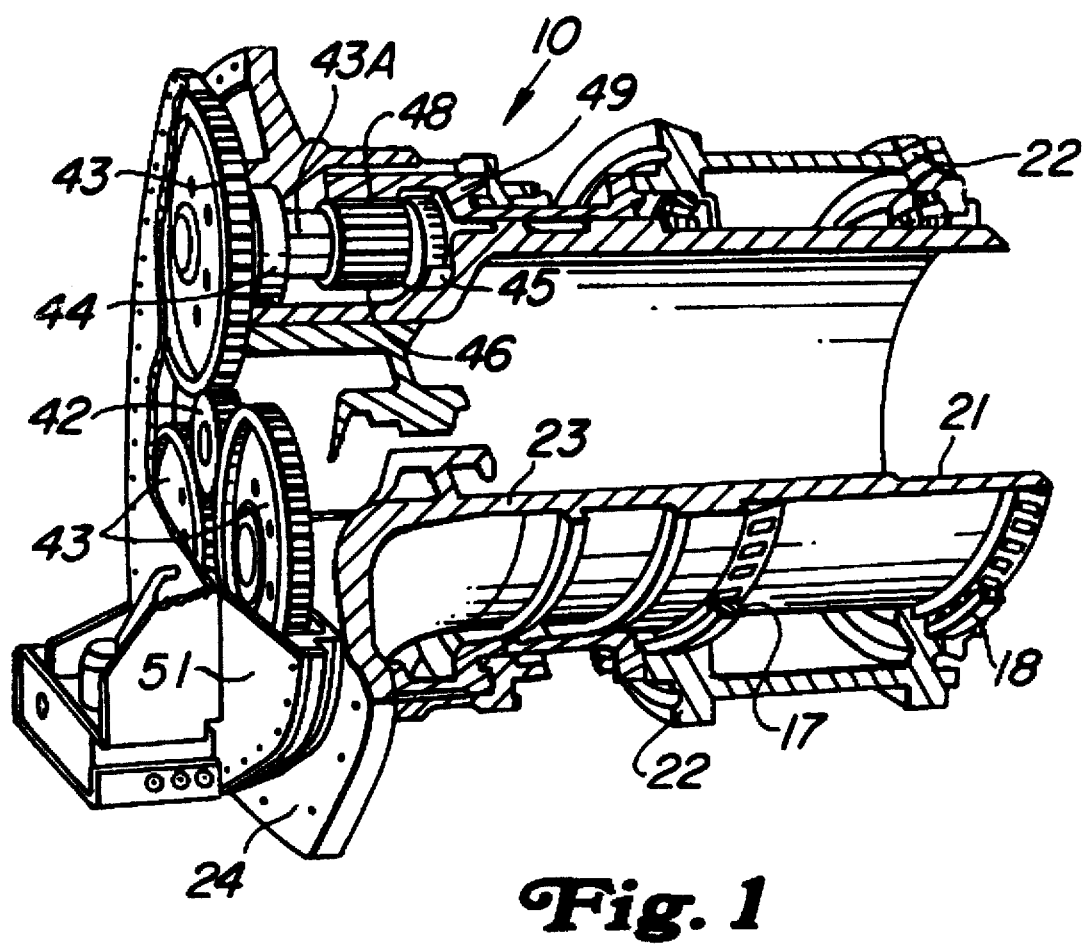
FIG. 1 is a partial cross-sectional view of a radially oriented gear drive assembly for use with the inventive wind turbine.

Before turning to a description of the wind turbine assembly, reference is first made to FIG. 1 which illustrates one form of a radially-oriented gear train assembly for use in the present invention. The gear train assembly 10 includes an inner hollow cylindrical member 21 and a concentric outer hollow cylindrical member 22. One end of inner member 21 is an integral part of a frame structure 23 having a flange 24 which may be bolted or otherwise attached to a stationary structure for supporting the inner member 21 in a cantilever fashion. Outer member 22 is rotatably supported on a pair of spaced apart, large annular bearing assemblies 17 and 18, preferably comprising tapered roller bearings. At the flanged end of inner member 21 is a sun pinion gear 42 which meshes with three surrounding planet gears 43. Each planet gear in turn is affixed to a corresponding shaft 43A that is rotatably supported by a pair of spaced apart bearings 44 and 45. Bearings 44 and 45 are mounted in the non-rotating frame structure 23 and each planet shaft has a pinion gear 46 between these bearings. Each planet pinion gear 46 engages the teeth of an internal ring gear 48 on the inboard end of a large diameter torque tube 49, whose other end is bolted to outer member 22 for rotation therewith. The planet and ring gears form a double reduction gear train, sometimes referred to as a "compound star" epicylic gear drive system, between sun pinion gear 42 and torque tube 49. A cover 51 encloses the gear train, which is immersed in oil.

The sun pinion gear 42 has a hollow center for receiving a rotor shaft. As will be described with regard to FIGS. 2 and 3, the rotor shaft may extend from an AC generator, so that rotation of sun pinion gear 42 will effect rotation of the generator rotor. In the gear train of FIG. 1, as outer member 22 is rotated by external means such as, for example, turbine blades attached to outer member 22, member 22, being connected to torque tube 49, will cause torque tube 49 to rotate about inner member 21. As torque tube 49 rotates, internal ring gear 48 engages planet pinion gears 46, effecting rotation of the shafts associated therewith and driving planet gears 43. The planet gears in turn drive sun pinion gear 42. The gear train or transmission illustrated in FIG. 1 thus utilizes a planetary gear system to provide high gear train efficiency in a minimum space. The large bearing and wheel diameters provide large load capacity and dynamic stability for external and internal loads. For example, inner member 21 typically has a relatively large inside diameter of about three feet. The gear train arrangement of FIG. 1 also reduces the axial length of the design envelope and minimizes the number of flange joints, couplings and clutches needed to construct a conventional gear train.

Figure 2:
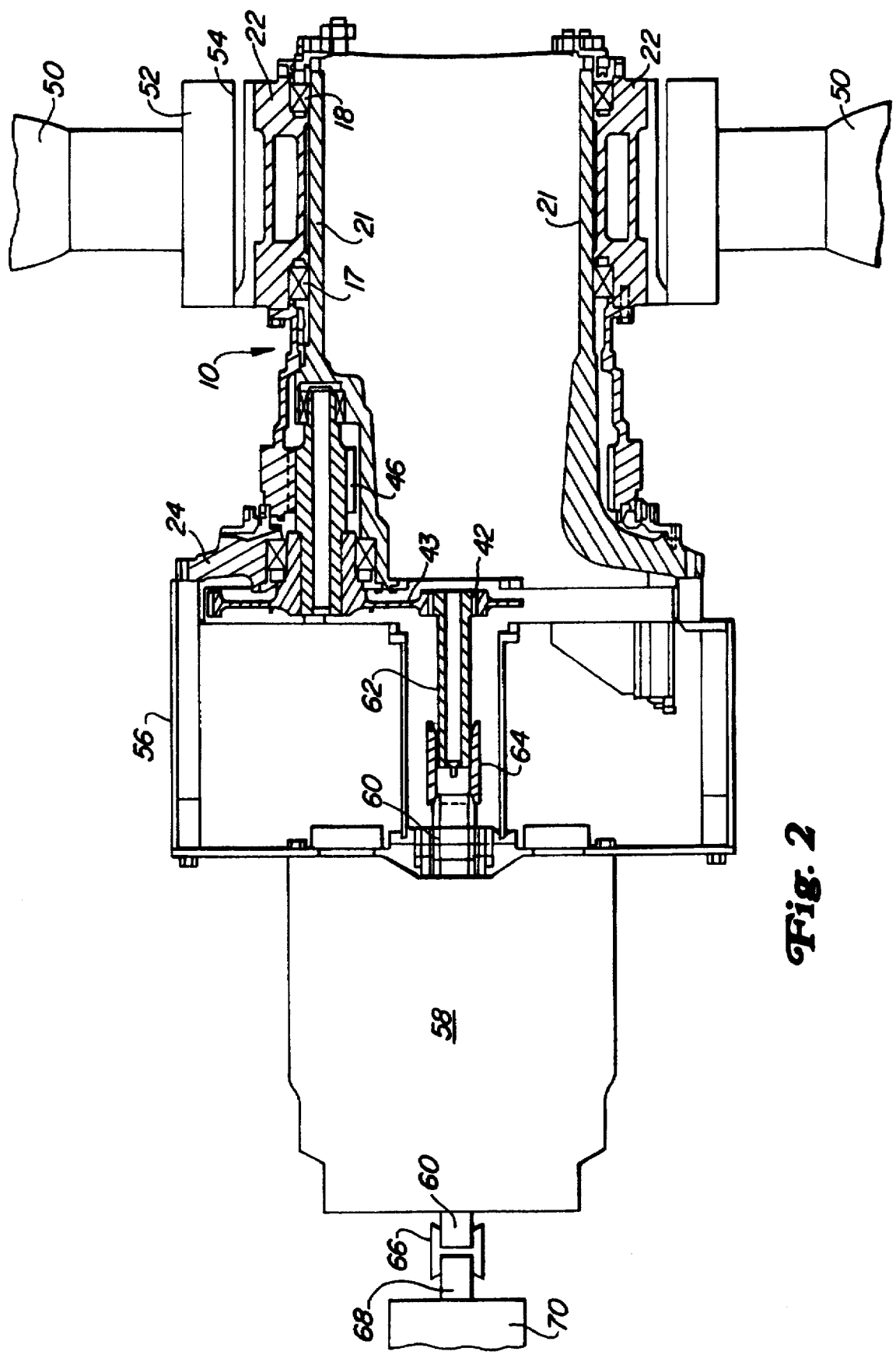
FIG. 2 is a simplified cross-sectional view of a wind turbine in accordance with the present invention.

FIG. 2, illustrates one example of a wind turbine incorporating the transmission or gear train of FIG. 1. In this embodiment, a plurality of propeller blades 50, each attached to a corresponding blade pitch change mechanism 52, are assembled on a blade hub assembly 54 which can be attached to outer cylindrical member 22. A support frame 56 is attached to flange 24 and supports an electric alternating current generator 58 mechanically attached to gear train assembly 10. Generator 58 includes a rotor (not shown) having a shaft 60 extending through a support 56. More particularly, shaft 60 is coupled to a secondary shaft 62 axially aligned with shaft 60. Sun pinion gear 42 is formed integrally on one end of shaft 62 in a position to engage planet gears 43. Shaft 60 is connected to intermediate shaft 62 through a mechanical coupling 64. Coupling 64 may have internal splines and be press fitted onto generator shaft 60, but is preferably pinned or otherwise locked to shaft 62 by means allowing a small amount of off-axis motion of shaft 62 so as to prevent bending at the interface between gear 42 and gears 43. Coupling 64 also allows AC generator 58 to be removed from the wind turbine assembly in the case of a failure of the generator. In a preferred form, AC generator 58 may comprise a conventional AC motor in which driving of shaft 60 allows the motor to be operated in a generating mode. As will be apparent, a relatively slow rotation of propeller blades 50 on outer member 22 effects relatively high speed rotation of rotor shaft 60 by virtue of the gear ratio between pinion gears 46, planet gears 43 and sun pinion gear 42.

Shaft 60 of motor 58 extends through the motor and an opposite end is attached, via another coupling 66, to a second shaft extension 68. Shaft extension 68 may be used to support a braking system (not shown) contained within a housing 70.

Figure 3:
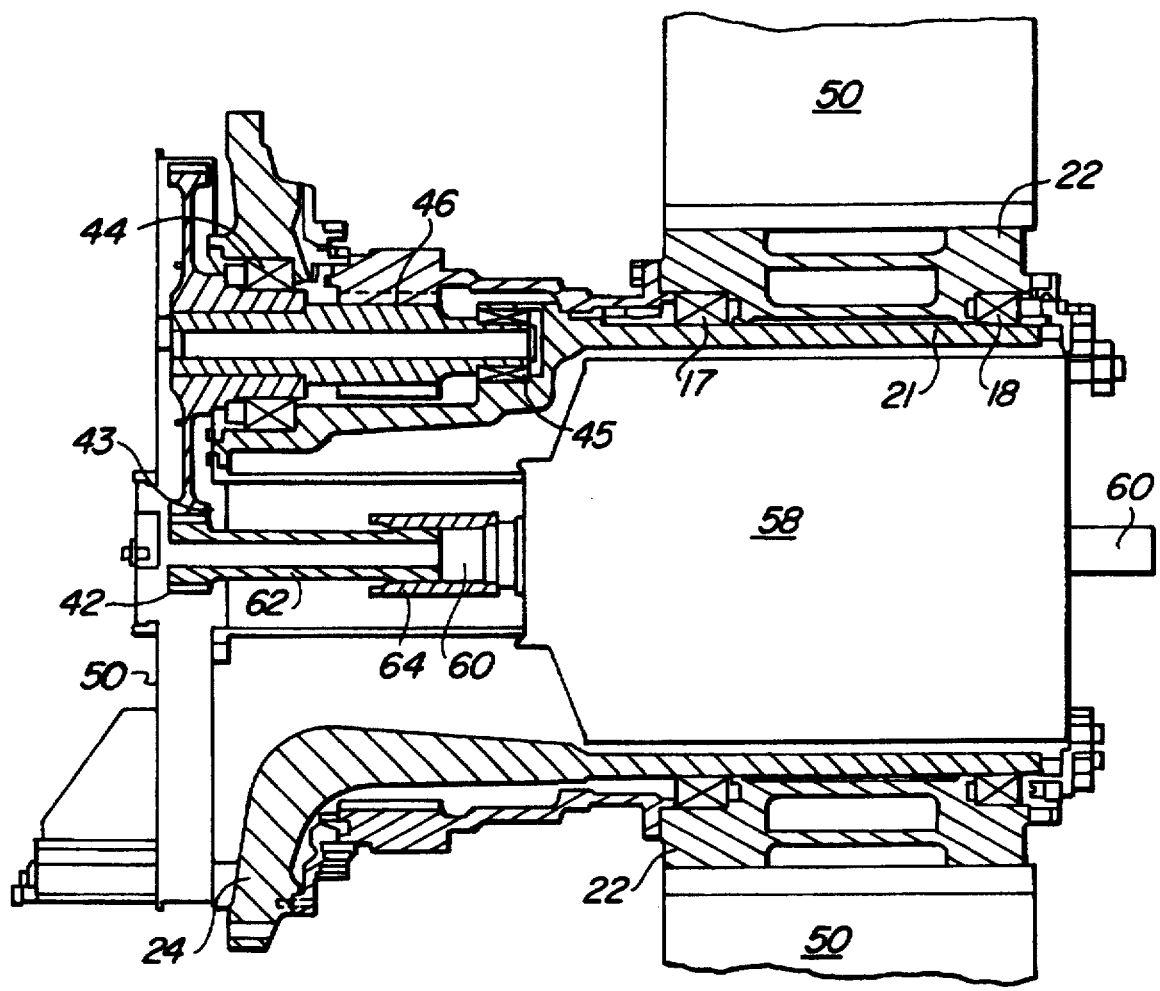
FIG. 3 is a cross-sectional view of an alternative form of the wind turbine of FIG. 2.

FIG. 3 shows an alternative embodiment of the wind turbine system of FIG. 2 in which AC generator 58 is mounted inside inner cylindrical hollow member 21 and affixed thereto. This arrangement goes even further in reducing overall length of the wind turbine assembly by utilizing the space within inner member 21. The connection between motor 58 and sun pinion gear 42 is essentially the same as shown in FIG. 2 except that shaft 62 now is inserted into the sun pinion gear from the opposite side.

While only certain preferred features of the invention have been illustrated and described, many modifications and changes will occur to those skilled in the art. It is, therefore, to be understood that the appended claims are intended to cover all such modifications and changes as fall within the true spirit of the invention.

What is claimed is:

1. A variable speed wind turbine having a radially-oriented gear drive comprising:

an inner hollow cylindrical member and an outer hollow cylindrical member, said inner member nested generally concentrically within said outer member and having two ends;

an annular flange attached to one end of the inner member and adapted to support said inner member in a stationary position;

a pair of spaced-apart, annular bearing assemblies circumscribing said inner member and supporting said outer member for rotation about said inner member;

an alternating current electric power generator coupled to said one end of said inner member and having a rotor shaft portion extending from one side of said generator into a position proximal said one end of said inner member;

a sun pinion gear coupled to said rotor shaft portion at an end thereof proximal said one end of said inner member;

a plurality of planet gears positioned in engagement with said sun pinion gear, each of said planet gears being mounted on a corresponding gear shaft with each gear shaft being supported for rotation on corresponding bearing means;

a pinion gear attached to each said gear shaft for rotation therewith;

a ring gear formed on an inner surface of said outer member and adapted to engage said pinion gear whereby rotation of said outer member is effective to rotatably drive said pinion gear to concurrently drive each associated planet gear to drive said sun pinion gear in a manner that effects rotation of said rotor shaft portion; and a plurality of propeller blades coupled to and extending radially outward of said outer member for effecting rotation of said outer member in response to wind impinging on said blades.

2. The wind turbine of claim 1 wherein said generator is mounted within said inner member.

3. The wind turbine of claim 1 wherein said generator is mechanically coupled to said one end of said inner member and extends coaxially therefrom.

4. The wind turbine of claim 1 wherein said generator comprises an alternating current electric motor.

5. The wind turbine of claim 1 and including mounting means attached to said inner member for supporting each said pinion .gear in an axially stationary position with respect to said inner member.

* * * * *